Oct. 13, 1942.   R. H. HILL ET AL   2,298,789
NON-OVERFILL DEVICE
Filed April 18, 1940
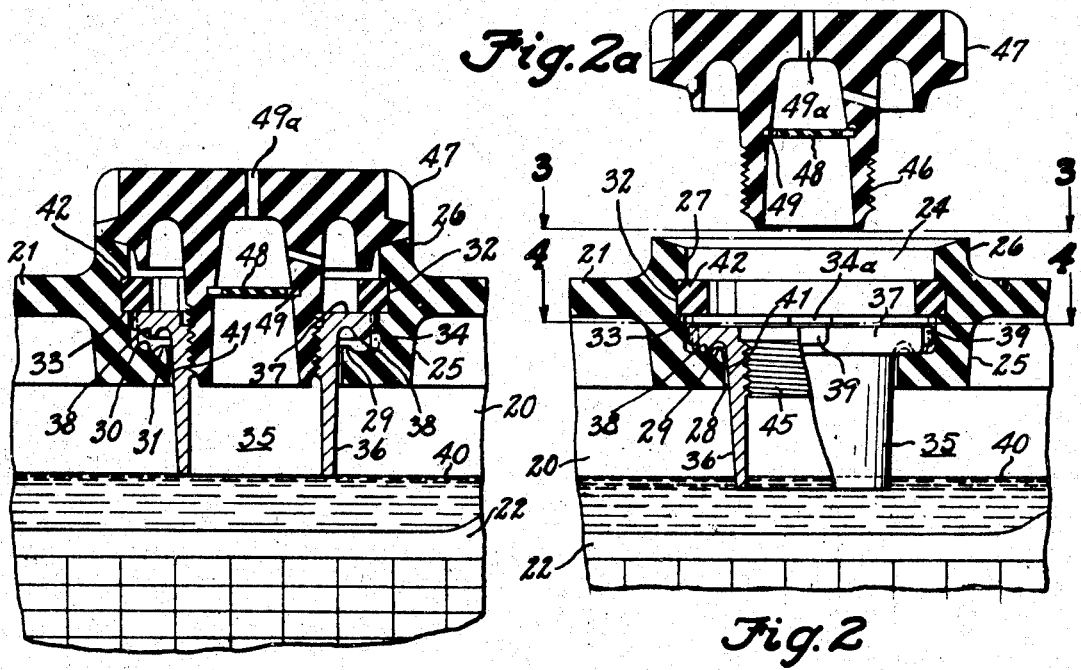
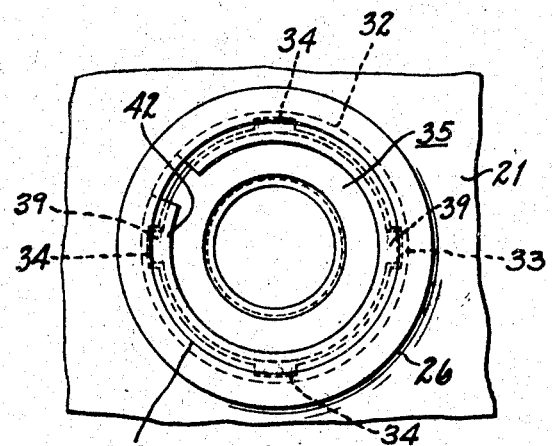
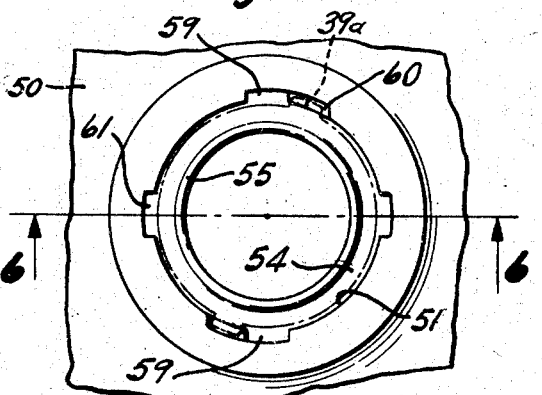
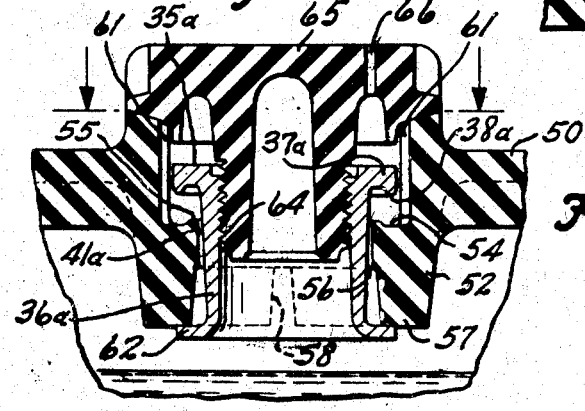
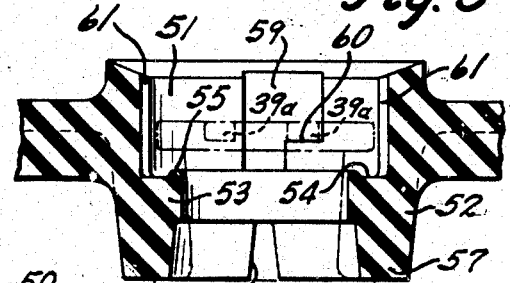
Inventors
Robert H. Hill
Richard M. Goodwin
BY
*Spencer Hardman & Fisher*
his ATTORNEYS Patented Oct. 13, 1942

2,298,789

UNITED STATES PATENT OFFICE 2,298,789

NONOVERFILL DEVICE

Robert H. Hill, Anderson, and Richard M. Goodwin, Muncie, Ind., assignors to General Motors Corporation, Detroit, Mich., a corporation of Delaware Application April 18, 1940, Serial No. 330,360

4 Claims. (Cl. 136—178)

This invention relates to cell cover assemblies incorporating non-overfill devices for storage battery cells or other containers for electrolyte, and is especially useful in storage batteries for automobile use.

The principal objects of the present invention are to provide a gravity seated valve mechanism within a vent and filler opening which prevents over filling of the battery cell with electrolyte, to provide for venting the cell above the liquid level through the opening, to provide a construction which will eliminate small vent openings in the wall of the filler opening that are easily clogged, and to provide a simple construction that can be easily assembled and disassembled.

Further objects and advantages of the present invention will be apparent from the following description, reference being had to the accompanying drawing wherein a preferred embodiment of the present invention is clearly shown.

Fig. 1 shows a vertical sectional elevation of a venting device for the cover of a storage battery embodying the features of the invention with the vent plug in place.

Figs. 2a and 2 are views showing the relative positions of the part shown in Fig. 1, when the vent plug is removed.

Fig. 3 is a plan view taken on line 3—3 of Fig. 2.

Fig. 4 is a sectional view of a modified form of the invention.

Fig. 5 is a plan view taken on the line 5—5 of Fig. 4 with the plug and valve part removed.

Fig. 6 is a sectional view taken on the line 6—6 of Fig. 5.

Referring to the drawing, 20 designates one wall of a storage battery cell. A cover 21 is attached to the cell 20 in any suitable manner, not shown. Located within the cell are the usual plates and separators, a fragment of one of the plates is shown at 22. The cover 21 is provided with a vent and filler opening 24 defined by a tubular projection 25 depending from the underside of the cover and a boss 26 on the upper side. The tubular projection provides an inlet 27 and an outlet 28 which is smaller in cross dimensions than the inlet. The filler opening 24 is provided with an annular ledge or valve seat 29 adjacent the outlet 28. The upper face of the ledge has an annular recess or groove 30 to provide an annular upwardly projecting lip 31 surrounding the outlet. The internal bore of the inlet is provided with an annular groove 32, the lower side of the groove provides a shoulder 33 having a series of spaced longitudinal notches 34 and 34a which terminates in the annular groove 30.

A weight member or gravity seated valve 35 is axially supported within the filler opening. This valve normally rests on the ledge 29. The valve is made of lead antimony or the like so as not to be affected by acids. The valve comprises a sleeve 36 provided with a flange 37 at its upper end which fits loosely within the inlet 24. The flange has an annular lip 38 depending from the lower side thereof. This lip is adapted to be received by the annular groove 30 of the ledge 29. The flange 37 is also provided with a pair of radially projecting lugs 39 which have a loose fit within the notches 34 of the filler opening. It will be observed, see Fig. 3, that the cross dimensions of the valve as a whole are slightly less than the cross dimensions of the filler opening so as to provide for a slight clearance therebetween. The notches 34 and lugs 39 cooperate to prevent appreciable rotative movements of the valve 35 within the filler opening 24. The sleeve 36 of the valve is preferably tapered on its external surface so that it will pass loosely through the outlet 28 to the normal electrolyte level indicated by numeral 40. Since the cross dimension of the sleeve 36 is smaller than the outlet a venting passage 41 is provided to connect the space exterior of the sleeve under the cover and above the electrolyte with the inlet. This space is sealed when the lip 38 on the flange 37 engages the bottom of the groove 30. The valve 35 is limited in its upward movement by a C-washer or split ring 42 of insulating material. The ring is snapped into the groove in the well known manner.

The interior wall of the sleeve 36 which is substantially concentric with the inlet 27 is provided with threads 45 which are adapted to receive a threaded portion 46 of a vent plug or cap 47 carrying a baffle 48 notched at 49 and provided with a vent 49a. When the cap 47 is removed from the cover, as shown in Fig. 2, the valve 35 when free of the threads on the cap will drop by the action of gravity until the lip 38 engages the bottom of the groove 30 on the ledge 29. The lip 38, together with the electrolyte in the groove or the film generally formed on the surface of the groove 30, will seal the vent passage 41 so that air will be trapped below the flange and in the space exterior of the skirt and the underside of the cover. When liquid is poured into the cell, its level will rise to that of the lowest edge of the sleeve 36 and thereafter air will be trapped in the space mentioned whereupon additional liquid will fill the interior of the sleeve without causing an appreciable rise of the electrolyte in the region exterior of the sleeve 36. The sudden rise of liquid within the sleeve indicates that the electrolyte has reached the desired level.

When the cap is replaced upon the cover, as shown in Fig. 1, the threads 46 of the cap engage the threads 45 of the sleeve and causing the valve to move axially upwards until the top surface of the flange 37 contacts with the snap ring 42. When this happens the lip 38 is removed from its supporting contact with the ledge 29 bringing the venting space 41 into communication with the inlet 24 and establishing communication between the space below the cover and above the electrolyte and the inlet 24 for the escape of air to relieve the pressure of air trapped in the space exterior of the sleeve and under the cover whereupon the liquid remaining within the sleeve recedes as the electrolyte seeks a common level. The egress of the air from the space 41 is around the periphery of the flange 37 which is spaced from the internal wall of the inlet 24 and then through the notches 34 and also the space between the ends of the C-ring 42, Fig. 3.

In the modified form of the invention shown in Figs. 4, 5 and 6 the cover 50 is provided with an opening 51 defined by a tubular sleeve 52 having an internally projecting ledge 53 at its lower end which has an annular groove 54 to form an annular lip 55 around an outlet 56. This ledge serves as a seat for the valve 35a. The underside of the ledge is provided by a boss 57 separated by notches 58. The wall forming the inlet is provided on its interior with two longitudinally extending notches 59 which are reduced near the ledge 53 as at 60 and with two longitudinally extending uniform notches 61. The notches 59 and 60 are located 90° apart. All of these notches terminate into the annular groove 54.

A metal sleeve or gravity valve 35a is mounted in the filler opening 51. This valve structure is substantially the same as valve 35 with this exception, the lower end of the sleeve 36a is flared as at 62. In this modified form of the invention it will be seen that the snap ring is entirely eliminated as the flared end 62 of valve sleeve 36a cooperates with the bosses 57 to maintain the valve 35a within the inlet and also limit the upward movement of the valve 35a. This construction permits the valve 35a to be assembled in the filler opening before the cover is secured in place with the container. By this arrangement it can be assured that the valve part 35a will have sufficient freedom of movement in the filler opening without the liability of becoming accidentally lost therefrom.

The interior of the sleeve 36a has screw threads 64 adapted to receive a threaded portion of a vent plug 65 and provided with a vent 66. When the plug 65 is removed and free of the threads 64 of the sleeve, the sleeve will drop by its own weight due to the action of gravity causing the lip 38a depending from the flange 37a to make contact engagement with the ledge thereby closing the vent passage 41a so that air will be trapped in the space between the exterior of the skirt 36a and the side walls of the cover and the container will rise to the lowest edge of the flared end and thereafter the air will be trapped in the space exterior of the sleeve 36a under the cover above the electrolyte.

When the cap or plug 65 is replaced upon the cover, as shown in Fig. 4, the threaded portion of the plug will engage the threads of the sleeve to lift the valve 35a a certain distance to break the seal between the lip 38a and the ledge so as to relieve the pressure of the air trapped in the space mentioned and establishing a communication between the space mentioned with outside atmosphere. The egress of the trapped air will pass from the space under the cover through the notches 58, vent passage 41a, notches 59 and 61 and then through the vent 66 of the plug 65.

When it is necessary to recharge the battery, such as during the process of manufacture, the vent plugs or caps 65 are usually removed from the cell covers 50. In order to prevent the valve 35 from sealing the filler opening during this operation, the valve is manually lifted and rotated clockwise as viewed in Fig. 5. This movement causes the lugs 39a formed on the ledge 37a of the valve to engage the offsets or shoulders 60 provided in the notches 59, see Figs. 5 and 6, to engage the shoulders 60 provided in the notches 59 and thus hold the ledge 37a apart from the seat 54. With the valve 35a in the position indicated by the dot-dash lines in Figs. 5 and 6, the gases can escape in the same manner as when the cap 65 is screwed into place.

While the embodiment of the present invention as herein disclosed, constitutes a preferred form, it is to be understood that other forms might be adopted, all coming within the scope of the claims which follow.

What is claimed is as follows:

1. A non-overfill device for a liquid container comprising the combination of a cover for the container having a filler opening therethrough, the wall of the filler opening having an inwardly extending ledge the upper face of which is provided with a continuous groove to receive a quantity of liquid; a valve located within the opening and having an opening through which liquid passes into the container and having an outwardly extending flange by which the valve is supported by the ledge, said flange being provided on its under face with a continuous lip received by the groove of the ledge, the liquid in the groove providing a seal at the contacting portions of the ledge and flange, the lower edge of the valve extending downwardly at least as far as the desired level of liquid in the container when the flange is supported by the ledge; a vent-plug for closing the filler opening; cooperating means provided by the plug and valve whereby turning the plug relative to the valve causes the valve flange to be lifted from the ledge whereby the container may be vented through the space between the valve flange and the cover ledge and through the vent provided by the plug; means for preventing rotation of the valve while permitting vertical movement thereof; and means for limiting the movement of the valve flange from the cover ledge.

2. A non-overfill device for a liquid container comprising the combination of a cover for the container having a filler opening therethrough, the wall of the filler opening having an inwardly extending ledge the upper face of which being shaped so as to retain a quantity of liquid; a valve located within the opening and having an opening through which liquid passes into the container and having an outwardly extending flange by which the valve is supported by the ledge, said flange being shaped so as to extend below the level of the liquid retained by the ledge when the ledge supports the valve the liquid retained by the ledge providing a seal at the contacting portions of the ledge and flange, the lower edge of the valve extending downwardly at least as far as the desired level of liquid in the container when the flange is supported by the ledge; a vent-plug for closing the filler opening; cooperating means provided by the plug and valve whereby turning the plug relative to the valve causes the valve flange to be lifted from the ledge whereby the container may be vented through the space between the valve flange and the cover ledge and through the vent provided by the plug; means for preventing rotation of the valve while permitting vertical movement thereof; and means for limiting the movement of the valve from the cover ledge.

3. A non-overfill device for a liquid container comprising the combination of a cover for the container having a filler opening therethrough including a collar above the cover the end of which is tapered and a depending skirt extending below the cover, the wall of the skirt having an inwardly extending ledge the upper face of which being shaped so as to retain a quantity of liquid, said skirt having side openings below the ledge and under the cover; an internally threaded sleeve loosely fitted in the opening through which liquid passes into the container and having an outwardly extending flange by which the sleeve is supported by the ledge, said flange being shaped so as to extend below the level of the liquid retained by the ledge when the ledge supports the sleeve, the liquid retained by the ledge providing a seal at the contacting portions of the edge and flange, the lower end of the sleeve extending downwardly at least so far as the desired level of liquid in the container when the flange is supported by the ledge; means for preventing rotation of the sleeve while permitting vertical movement thereof; means including a part of the sleeve cooperating with the lower end of skirt for limiting the upward vertical movement of the sleeve; a vented plug having a flange whose under surface is tapered to engage the taper of the collar and also having a depending externally threaded portion for threaded engagement with the sleeve whereby turning the plug relative to the sleeve causes the flange of the sleeve to be lifted from the ledge whereby the container may be vented through the side openings in the skirt and through the space between the sleeve flange and skirt ledge and through the vent provided by the plug.

4. A non-overfill device for a container for electrolyte comprising the combination of a cover for a container having a filler opening therethrough, the wall of the filler opening having an inwardly extending ledge the upper face of which is constructed to receive a quantity of liquid, said wall having vertical grooves provided with side notches to form shoulders above the ledge; a depending skirt about the opening and terminating above the proper electrolyte level in the container; a valve loosely located within the opening through which liquid passes into the container and having an outwardly extending flange by which the valve is supported, said flange being shaped so as to extend below the level of the liquid retained by the ledge when the ledge supports the valve, the liquid retained by the ledge providing a seal at the contacting portions of the ledge and flange, the lower edge of the valve extending downwardly at least as far as the desired level of liquid in the container when the flange is supported by the ledge; a vent plug for closing the filler opening; cooperating means provided by the plug and valve whereby turning the plug relative to the valve causes the flange to be lifted from the ledge whereby the container may be vented through the vent provided by the plug; lugs carried by the flange extending into the groove for preventing rotation of the valve for a predetermined distance while permitting vertical movement thereof, said valve being capable of being lifted further in the vertical direction and slightly turned so that the lugs rest on the shoulder to support the valve from the ledge permitting recharging when desired with the vent plug removed; and means for preventing accidental removal of the valve from the opening.

ROBERT H. HILL.
RICHARD M. GOODWIN.